United States Patent
Vrhel, Jr. et al.

(10) Patent No.: US 6,543,047 B1
(45) Date of Patent: Apr. 1, 2003

(54) METHOD AND APPARATUS FOR TESTING CUSTOM-CONFIGURED SOFTWARE/HARDWARE INTEGRATION IN A COMPUTER BUILD-TO-ORDER MANUFACTURING PROCESS

(75) Inventors: Thomas Vrhel, Jr., Austin, TX (US); Gaston M. Barajas, Cedar Park, TX (US); Paul J. Maia, Cedar Park, TX (US); W. D. Todd Nix, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/333,786

(22) Filed: Jun. 15, 1999

(51) Int. Cl.$^7$ .................................................. G06F 9/44
(52) U.S. Cl. ...................... 717/121; 717/102; 717/103; 717/126; 717/177; 717/178
(58) Field of Search .............................. 717/11, 1, 124, 717/177–178, 101–103, 121, 123, 126

(56) References Cited

U.S. PATENT DOCUMENTS

| | | |
|---|---|---|
| 5,185,877 A | 2/1993 | Bissett et al. |
| 5,379,342 A | 1/1995 | Arnold et al. |
| 5,583,560 A | 12/1996 | Florin et al. |
| 5,590,345 A | 12/1996 | Barker et al. |
| 5,590,544 A | 1/1997 | Corduan et al. |
| 5,594,509 A | 1/1997 | Florin et al. |
| 5,613,012 A | 3/1997 | Hoffman et al. |
| 5,621,456 A | 4/1997 | Florin et al. |
| 5,633,999 A | 5/1997 | Clowes et al. |
| 5,668,992 A | 9/1997 | Hammer et al. |
| 5,802,368 A | 9/1998 | Grigsby et al. |
| 5,812,852 A | 9/1998 | Poulsen et al. |
| 5,894,571 A * | 4/1999 | O'Connor ...................... 713/2 |
| 5,995,757 A * | 11/1999 | Amberg et al. ................ 717/11 |
| 6,182,275 B1 * | 1/2001 | Beelitz et al. ................. 717/1 |
| 6,236,901 B1 * | 5/2001 | Goss ............................ 700/95 |
| 6,247,126 B1 * | 6/2001 | Beelitz et al. ................. 713/1 |
| 6,298,427 B1 * | 10/2001 | Beelitz et al. ............... 711/173 |
| 6,327,706 B1 * | 12/2001 | Amberg et al. ............. 717/174 |
| 6,351,769 B1 * | 2/2002 | King et al. .................. 709/224 |

OTHER PUBLICATIONS

Coleman, "The Influence of Manufacturing Paradigms on System Development Methodologies", IEEE, pp. 776, Sep. 1989.*

* cited by examiner

Primary Examiner—Gregory Morse
Assistant Examiner—Ted T. Vo
(74) Attorney, Agent, or Firm—Michael J. Balconi-Lamica; Haynes and Boone, LLP

(57) ABSTRACT

A build-to-order manufacturing method for producing a custom configured computer system includes obtaining a customer order. Hardware for the custom configured computer system is assembled in accordance with the customer order. The assembled hardware is then tested using software tools and utilities. Next, software is downloaded to the computer system in accordance with the customer order, the software including an operating system (OS). Lastly, a fully integrated system test is performed, the fully integrated system test including the execution of an OS setup for fully integrating the hardware and software of the custom configured computer system and testing of the fully integrated hardware and software from the OS' perspective prior to shipment to a customer.

25 Claims, 4 Drawing Sheets

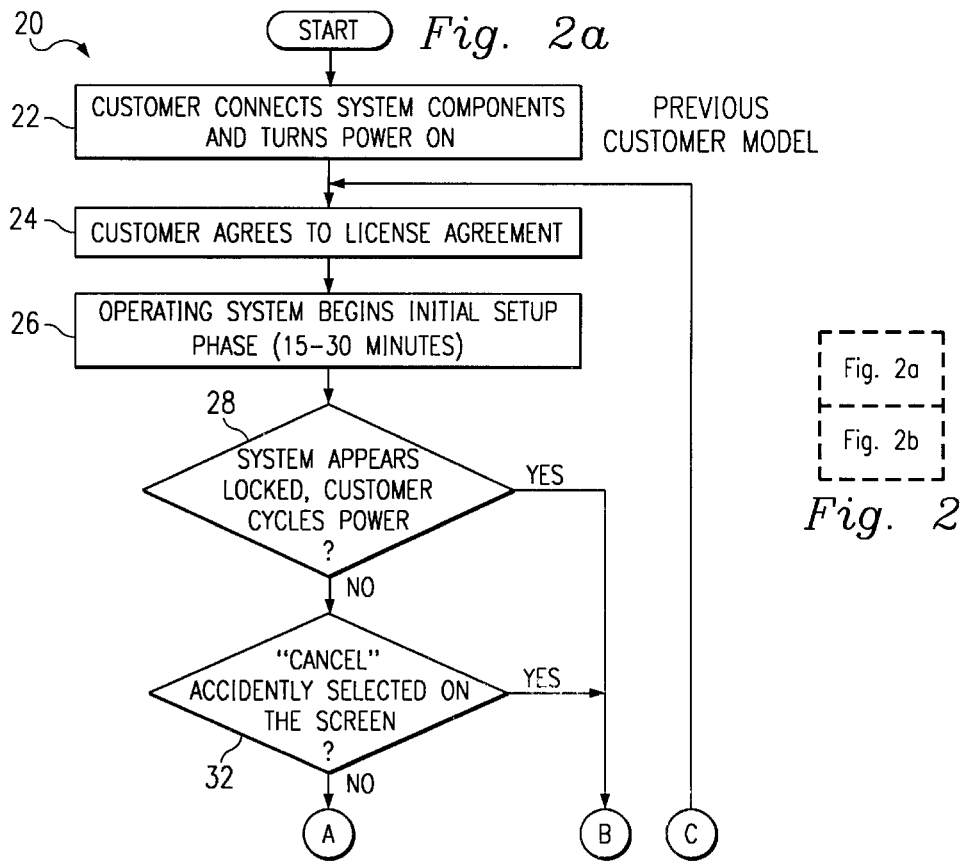
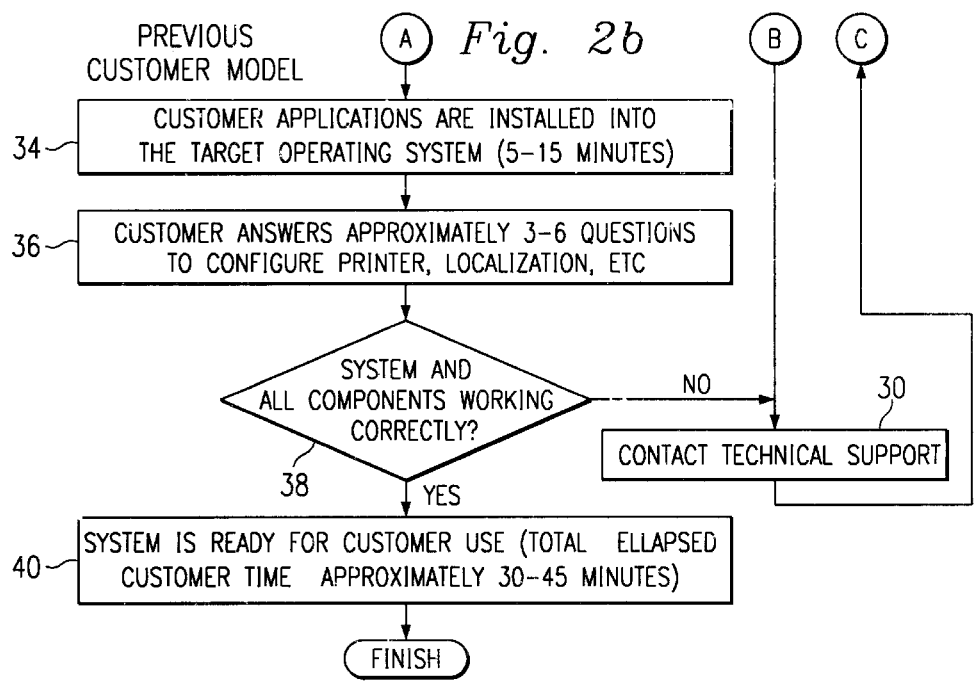

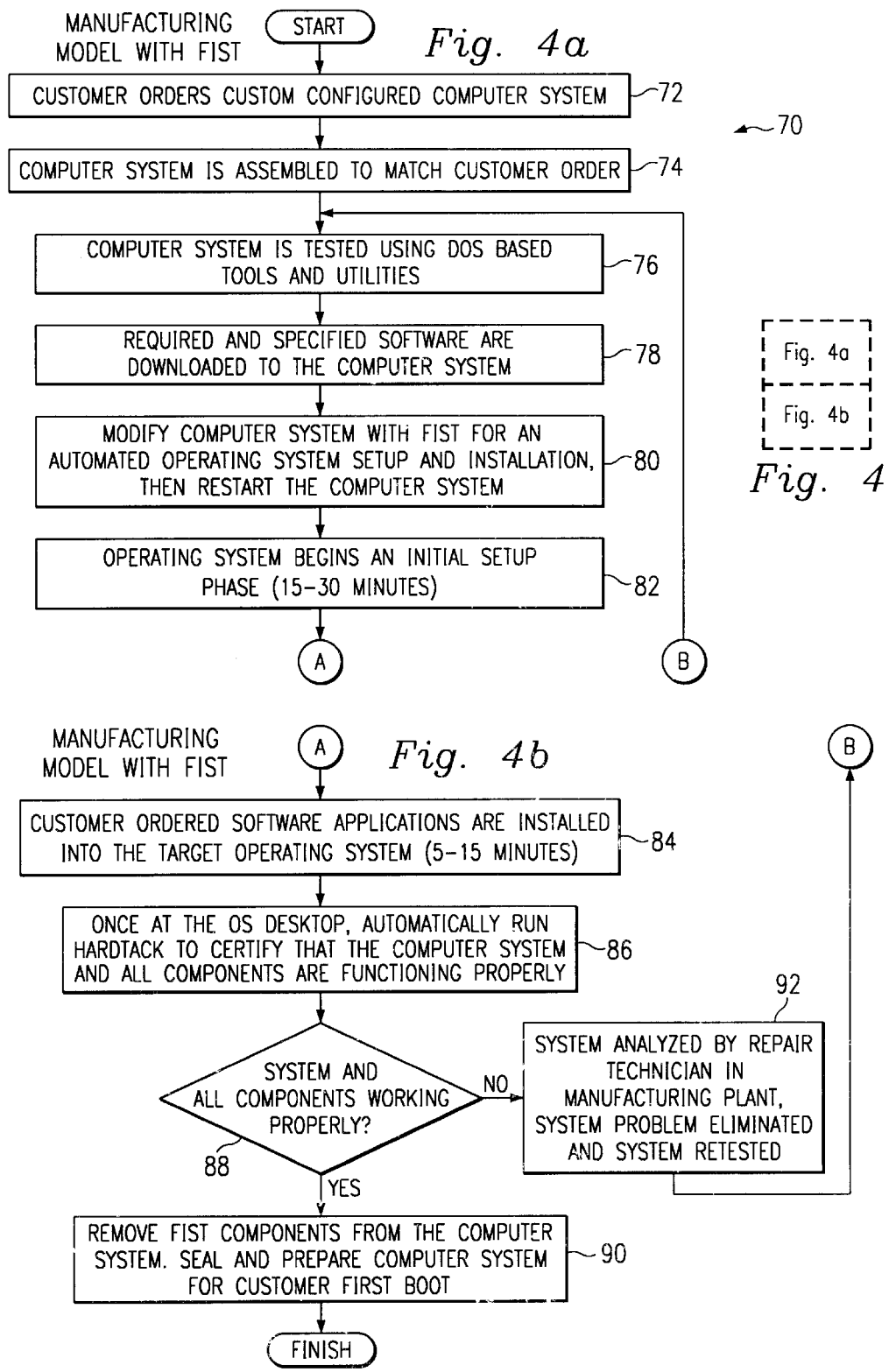

METHOD AND APPARATUS FOR TESTING CUSTOM-CONFIGURED SOFTWARE/HARDWARE INTEGRATION IN A COMPUTER BUILD-TO-ORDER MANUFACTURING PROCESS

CROSS-REFERENCE TO CO-PENDING APPLICATION

This application relates to co-pending U.S. patent application Ser. No. 09/919,959, filed on Aug. 29, 1997, (now U.S. Pat. No. 5,995,757 issued Nov. 30, 1999) entitled "Software Installation and Testing for a Build-to-order Computer System", naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/984,357, filed on Dec. 3, 1997, (now abandoned) entitled "Technique for Performing Factory Installation of Software", naming John A. Odendahl as inventor. The co-pending application is incorporated herein by reference in its entirety, and is assigned to the assignee of the present invention.

This application relates to co-pending U.S. patent application Ser. No. 08/920,773, filed on Aug. 29, 1997, (now U.S. Pat. No. 5,991,543 issued Nov. 23, 1999) entitled "Software Installation and Testing for a Build-to-order Computer System", naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/921,438, filed on Aug. 29, 1997, (now U.S. Pat. No. 5,963,743 issued Oct. 5, 1999) entitled "Database for Facilitating Software Installation and Testing for a Build-to-suit Computer System", naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 09/236,862, filed on Jan. 25, 1999, (now U.S. Pat. No. 6,247,126 issued Jun. 12, 2001) entitled "Recoverable Software Installation Process and Apparatus for a Computer System", naming Alan E. Beelitz and Richard D. Amberg as inventors. The co-pending application is incorporated herein by reference in its entirety, and is assigned to the assignee of the present invention.

This application relates to co-pending U.S. patent application Ser. No. 09/271,581, filed on Mar. 18, 1999, entitled "System and Method for Installing System Manufacturer Provided Software", naming Anil Rao and Wayne Weilnau as inventors. The co-pending application is incorporated herein by reference in its entirety, and is assigned to the assignee of the present invention.

This application relates to co-pending U.S. patent application Ser. No. 09/169,324, filed on Oct. 9, 1998, (now U.S. Pat. No. 6,262,726 issued Jul. 17, 2001) entitled "Factory Installing Desktop Component For Active Desktop", naming James McGlothlin and Roy Stedman as inventors. The co-pending application is incorporated herein by reference in its entirety, and is assigned to the assignee of the present invention.

This application relates to co-pending U.S. patent application Ser. No. 09/237,760, filed on Jan. 26, 1999, (now U.S. Pat. No. 6,279,156 issued Aug. 21, 2001) entitled "A Method of Installing Software on and/or Testing a Computer System", naming Richard D. Amberg, Roger W. Wong and Michael Lynch as inventors. The co-pending application is incorporated herein by reference in its entirety, and is assigned to the assignee of the present invention.

This application relates to co-pending U.S. patent application Ser. No. 09/315,657, filed on May 19, 1999, (now U.S. Pat. No. 6,385,766 issued May 7, 2002) entitled "A Method and Apparatus For Windows-Based Installation For Installing Software on Build-To-Order Computer Systems", naming Bobby G. Doran, Jr., Bill Hyden, and Terry Wayne Liles as inventors. The co-pending application is incorporated herein by reference in its entirety, and is assigned to the assignee of the present invention.

BACKGROUND

The disclosures herein relate generally to computer systems, and more particularly, to a method and apparatus for testing custom-configured software/hardware integration in a computer system build-to-order manufacturing process.

A build-to-order (BTO) computer system manufacturing process is driven by menu selection of peripherals, operating system, and application(s), via on-line or telephone. Selections include basic system, RAM, ROM, processor, plug-in cards, operating system (OS), and software applications (e.g., Office 97, WP). There exists a large selection to order from and the BTO computer manufacturer has no prior knowledge of what a customer will order. BTO involves mass configuration/customization where each configuration may be built to an order size of one.

With reference to FIG. 1, in the BTO manufacturing process 10, a customer order drives what hardware is to be assembled (Step 12) for a given custom configured computer system. After hardware assembly, the target system is put into a burn rack (Step 14). In the burn rack (Step 14), hardware is tested (Step 16) (e.g., using software based tools and utilities) and software downloaded (Step 18). During software download (Step 18), the software is layered onto the hard disk drive of the target system. There exist separate software components i) for the OS, ii) for drivers that are specific to plug-in cards and other devices which have been added to a custom configured computer system, and iii) for various applications, which have been ordered with the custom configured computer system.

As discussed, the software components are layered onto the hard drive of the target system in accordance with the customer order (Step 18). There may be some amount of adjustments/modifications which are made to the downloaded software to account for interactions, in certain instances, for use later during OS setup. For instance, a software driver may support several different plug-in cards and an adjustment to the configuration of the software driver may be required to handle interoperability between components. Upon completion of processing in the burn rack, the custom configured computer system is scanned for viruses, packaged, and shipped to the customer.

With the previous manufacturing model as discussed with respect to FIG. 1, the OS completes its own setup and configuration, the installation of the software drivers, and the installation of applications, at the customer site upon first customer boot. During this first boot at the customer site, files are copied, hardware is viewed/verified by the OS, applications are installed, time zone is set, etc., as discussed below with reference to a customer model 20 of FIG. 2.

With reference now to FIG. 2, customer model 20 resulting from the BTO manufacturing model of FIG. 1 is presented. The customer model 20 begins with a customer connecting system components together (Step 22) such as the keyboard, monitor, pointing device, etc. to the base unit of the computer system and powering the computer system ON. In a next step, the customer agrees to a typical software license agreement (Step 24). Subsequently, the OS begins an initial setup phase which may consume from fifteen (15) to thirty (30) minutes to complete (Step 26). During the initial setup phase, the computer system may appear to the customer to be hung or non-operational. In Step 28, if the system appears locked up (or hung) and the customer cycles the power OFF/ON, then the customer model advances to Step 30 for obtaining technical support. If the power is not cycled OFF/ON in Step 28, then the process continues at Step 32. In Step 32, if CANCEL is accidentally selected such as on the monitor screen by the customer, then the process advances to Step 30 for obtaining technical support, otherwise the process advances to Step 34. In Step 34, the customer ordered applications are installed into the target OS which consumes anywhere from five (5) to fifteen (15) minutes or more, depending upon the particular applications being installed. In Step 38, an inquiry is made internal to the computer system to determine if the system and all components are working correctly. If not, then the process advances to Step 30 for obtaining technical support. Obtaining of technical support can include troubleshooting the computer system by reading the owner's manual or contacting the manufacturer's technical support hotline. The manufacturer's technical support hotline can typically assist the customer over the phone, for example, in restoring the system to an as-shipped condition. Such assistance might involve the shipping of a recovery CD-ROM, replacement hard disk drive, replacement component, or a new computer system to the customer. In the instance of returning the computer system to an As-Shipped condition, the customer model would then repeat beginning at Step 24. If in Step 38 the system and all components are working correctly, then in Step 40, the computer system is ready for customer use. The total time elapsed for the customer in setting up the new computer system is approximately twenty (20) to forty-five (45) minutes, provided that no problems were encountered during the setup. Upon the occurrence of any problems, the total time elapsed will be increased accordingly.

The BTO process as described above is what is referred to as a "spray and pray" manufacturing model. That is, the computer manufacturer sprays the bits down onto the hard disk drive and prays that when the customer performs the initial computer system setup at the customer site, long after the manufacturer has touched the computer system, that the computer system initial setup works well. With the spray and pray model, there is no guarantee that the setup completed. There is also no check of the final computer system, both software and hardware, integrity. With this model, the set-up is not complete until the computer system is at the customer site and undergoes the OS setup.

Because each custom built computer system includes a unique configuration, where the components can be different from one system to another, there was no readily available way to verify that everything on a given computer system was installed correctly and working properly. In such an instance, a customer's action of not calling the manufacturer for technical support was an indication that the OS setup was successful. In addition, the OS setup may have completed to a certain level at which the customer didn't recognize that the OS setup did not completely set up.

As discussed, each configuration is an order size of one, with the possibility that each system could be completely different. Every single possible combination of computer system configuration (hardware and software) can not be tested using traditional testing techniques. To do so would render the BTO manufacturing process economically unacceptable and would further unduly lengthen the development process. Rather than test every custom computer system configuration, only a limited number or percentage of the configurations are tested (i.e. those configurations which are high runners). This however results in a very large number of configurations that do not get tested. For instance, the manufacturer may offer ten (10) base systems by ten (10) peripherals, by ten (10) other peripherals, by ten (10) applications, by ten (10) other applications, by ten (10) peripherals, etc. which would result in too many combinations to test economically and in a timely manner. All of the combinations come together for producing completely unique systems. Thus with a build-to-order manufacturing process, an extremely large number of unique computer system configurations are possible. Furthermore, the set of all possible computer system configurations cannot be tested in the development portion of a build-to-order manufacturing process on an economically and timely basis to ensure that all possible interactions between the various software and hardware components have been identified prior to introduction of a new hardware or software component.

In the prior manufacturing process, tests may have been run to ensure as much as possible that defective component parts would not leave the factory. Components could be individually tested, however, as discussed above, it was not possible to test all configurations of components. A situation might arise, for example, in which a first component A and a second component L were installed in a computer system where the two components needed a common resource but could not share the resource. At the customer site, the two components (A and L) might end up interfering with one another during OS setup. Independently, each component may have tested acceptable at the factory, however, the components were found to not work together in combination at the customer site. The components were not tested together with the OS that a customer intended to run. Instead, the components were individually tested using software tests, prior to installing the OS on the target system.

In a typical computer system, the OS (e.g., Windows 95 (W95), Windows 98 (W98), Windows NT (NT4 or NT5) from Microsoft Corporation, of Redmond, Wash. or other OS) requires that at an initial boot (such as, when a customer powers ON the computer system for the very first time), a lengthy process of software installation, hardware detection, and hardware/software configuration be executed. Such a process can take between twenty (20) and forty-five (45) minutes for many custom-configured build-to-order computer systems, and generates considerable user confusion. In addition, any interruption of this process may result in a system state that cannot be recovered without reinstalling the OS. Reinstalling the OS causes additional frustration for the customer and increases the cost of the computer system through technical support calls and in some instances, replacement of hard disk drives which are not otherwise faulty.

The method of installing an OS occurring as it does at a customer site, does not allow for a build-to-order computer system manufacturer to fully test the fully integrated hardware and software of a given custom configured computer system prior to the computer system being shipped to a respective customer. In such a method, final integration actually occurs at the customer site.

With the above described "spray and pray" manufacturing process, in the manufacture of a build-to-order computer system, the manufacturer performed as much testing as could reasonably be afforded, sprayed the appropriate bits onto a given computer's hard drive, and prayed that the installation/configuration/setup process went well at first customer boot.

It would thus be desirable to provide a BTO manufacturing process having an extensive system integrity check. Such a system integrity check should test that the software is the correct software, the hardware is the correct hardware, and the interoperability of the software and hardware is what it is intended to be for the particular custom built target computer system.

SUMMARY

According to one embodiment, a build-to-order manufacturing method for producing a custom configured computer system includes obtaining a customer order. Hardware for the custom configured computer system is assembled in accordance with the customer order. The assembled hardware is then tested using software tools and utilities. Next, software is downloaded to the computer system in accordance with the customer order, the software including an operating system. Lastly, a fully integrated system test is performed. The fully integrated system test including the execution of an OS setup and testing of the fully integrated hardware and software from the operating system's perspective prior to shipment to a customer.

The embodiments of the present disclosure advantageously enable a high level of system integrity to be confirmed in a custom configured computer system build-to-order manufacturing process, including checking that the software is the correct software, the hardware is the correct hardware, and that the interoperability of the software and hardware is what it is intended for the particular custom built target computer system.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which:

FIG. 2 is a flow diagram view of a previous customer model in connection with a first customer boot of a custom configured computer system;

FIG. 4 is a more detailed flow diagram view of the custom configured build-to-order manufacturing process of FIG. 3;

DETAILED DESCRIPTION

Figure 1:
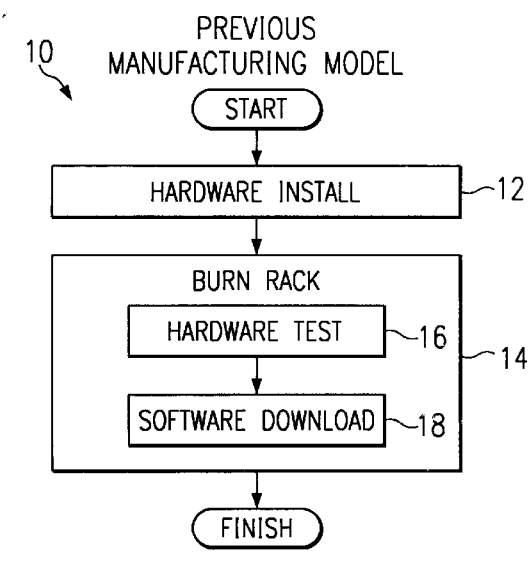
FIG. 1 is a flow diagram view of a previous custom configured computer system build-to-order manufacturing process.

The present embodiments include a new process referred to herein as Fully Integrated System Test (FIST). FIST takes over after the old "spray and pray" process finishes, but before the custom configured computer system is shipped to the customer. That is, subsequent to hardware installation, hardware testing, and software download, the custom configured computer system is rebooted, and the OS setup is run, along with any driver, utility, and application installations required, per the given customer order. The computer system then executes a prescribed HardTack software program or module that investigates a registry enumeration tree (created during the OS setup) for problem and status codes to determine if any piece of hardware is not fully functional. The prescribed HardTack software program or module furthermore checks the level of hardware/software integration that has occurred as the OS has been set up and attempts to recognize all hardware as specified in the customer order. In addition to ensuring that all the hardware-related software components are installed properly and functional according to the OS, the FIST process will also identify any missing hardware. To do this, the FIST process compares the elements in the given computer system to the elements in a respective customer order, the later being downloaded in a computer readable form onto the computer system being manufactured as part of the software installation process. The FIST process also identifies any additional hardware that was mistakenly installed but not specified in the respective customer order.

In addition to the above, another major benefit of the FIST process is that the first boot at the customer site requires between two and five minutes, in contrast to 20 to 45 minutes previously required by the prior manufacturing process. The customer's opportunity to perceive the computer system as being hung and the likelihood of the customer causing an interrupt in the setup process are thus significantly reduced. FIST improves both build-to-order computer system quality and the customer experience.

As discussed herein, the FIST process incorporates a number of elements that result in the following process characteristics. Complete installation of software (i.e., OS, utilities, and applications) occurs in the BTO factory based on a custom-configured order. The status of any custom configuration can be checked to ensure that all hardware elements have been properly recognized by the OS and are properly configured and operational, per the particular OS of the given build-to-order computer system. The FIST process further enables the detection of additional hardware, if any, that may have been installed but was not part of the customer order. Most conflicts or problematic interactions that may not have been tested during qualification or factory install validation processes can be readily detected via FIST. Lastly, the customer setup time is dramatically reduced, thus lowering technical support costs and improving customer satisfaction.

Figure 3:
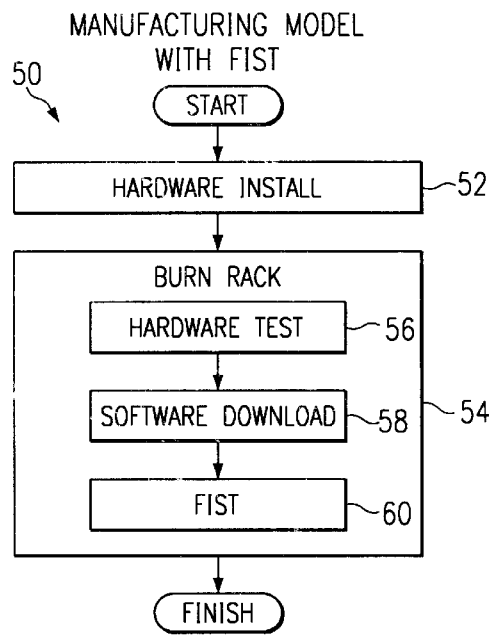
FIG. 3 is a flow diagram view of a custom configured computer system build-to-order manufacturing process according to the fully integrated system test embodiments of the present disclosure.

With reference now to FIG. 3, in the BTO manufacturing process 50, a customer order drives what hardware is to be assembled (Step 52) for a given custom configured computer system. After hardware assembly, the target system is put into a burn rack (Step 54). In the burn rack (Step 54), hardware is tested (Step 56) (e.g., using software based tools and utilities) and software downloaded (Step 58). During software download (Step 58), the software is layered onto the hard disk drive of the target system. There exists separate software components i) for the OS, ii) for drivers that are specific to plug-in cards or other devices which have been added to a custom configured computer system, and iii) for various applications, which have been ordered with the custom configured computer system. Subsequent to the software download, a fully integrated system test is carried out in Step 60, further as discussed herein.

Turning now to FIG. 4, in accordance with one embodiment 70 of the present disclosure, the BTO manufacturing model with FIST of FIG. 3 is explained in further detail. The process begins with a customer ordering a custom configured computer system in Step 72. In Step 74, the computer system hardware is assembled to match the customer order. In Step 76, the computer system hardware is tested using software based tools and utilities. In Step 78, required and specified software (including drivers) are downloaded to the hard disk drive of the target computer system. In step 80, the manufacturing process includes modifying the target computer system with FIST for performing an automated OS setup and installation, and then restarting the computer system to begin the OS setup. In Step 82, the OS of the custom configured computer system begins an initial setup phase which consumes on the order of approximately fifteen (15) to thirty (30) minutes to complete. In Step 84, customer ordered software applications are installed into the target OS, consuming on the order of approximately five (5) to fifteen (15) minutes. Upon reaching the OS desktop, in Step 86, a HardTack program is executed to certify that the computer system and its components are functioning properly, as well as other functions, to be discussed in further detail below. In Step 88, a query is made as to whether or not the computer system and all components tested okay. If the computer system and all components tested okay, then in Step 90, the FIST components are removed from the target computer system. In addition, the target computer system is sealed and prepared for a subsequent first customer boot. Upon completion of Step 90, the custom configured computer system is scanned for viruses, packaged, and shipped to the customer. If the computer system and all components did not test okay in Step 88, then in Step 92, the target computer system is removed from the burn rack and analyzed by a service and/or repair technician within the manufacturing plant in accordance with errors uncovered by FIST and corrective action is taken, as appropriate. The system problem is eliminated and the system retested, for example, by returned the same to the burn rack and beginning again at Step 76.

Figure 5:
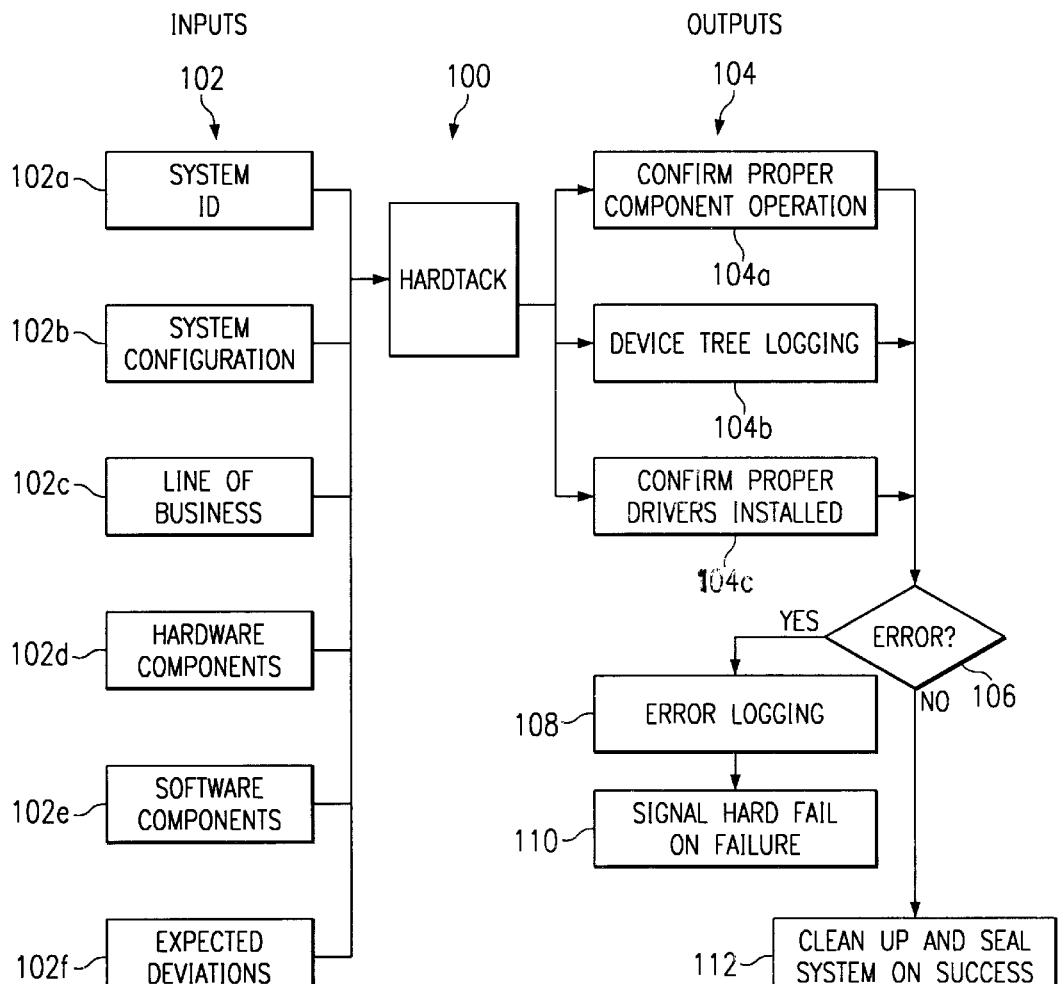
FIG. 5 is a flow diagram view of the HardTack module for use with the fully integrated system test embodiments of the present disclosure.

Referring now to FIG. 5, the HardTack module 100 shall be briefly discussed. As mentioned, HardTack is a part of FIST. HardTack 100 receives inputs 102 and provides prescribed outputs 104. Inputs 102 may include at least one of the following selected from the group consisting of a system ID 102a, a system configuration 102b, a line of business 102c, hardware components 102d, software components 102e, and expected deviations 102f. The system ID 102a may include, for example, a serial number or service tag ID for identifying the particular target system being manufactured. The system configuration 102b may include, for example, a listing of the hardware and software components of a customer order. The line of business 102c may include the particular base unit identification of a given line of business, such as a particular desktop (e.g., OptiPlex GXpro) or notebook (e.g., Inspiron) model base unit. Hardware components 102d include those as ordered per the customer order. Software components 102e include those as ordered per the customer order. Expected deviations 102f include prescribed deviations which can be expected for a particular type of computer system being manufactured.

Referring still to FIG. 5, the HardTack output 104 includes at least one of the following selected from the group consisting of a confirmation of proper component operation 104a, a logging of a device tree for the target computer system 104b, and a confirmation of proper drivers being installed in the target computer system 104c. As shown in FIG. 5, the outputs of HardTack are queried at 106 to determine whether or not any errors were detected. If errors, then a suitable error logging 108 is performed and a hard fail is signaled at 110. If no errors, then the computer system is cleaned up by the removal of the HardTack and FIST components and resealed at 112 (similar to Step 90 of FIG. 4).

There are a number of elements that compose the FIST process, including software program instructions for performing the following tasks. Manufacturing process software or code is provided which initiates and controls the OS setup process in the BTO factory burn rack. Prescribed software (i.e., the HardTack module or program) is also provided which tests the hardware/software integration, and ensures that the OS has not detected any conflicts or other faults. In addition, the prescribed software (i.e., HardTack) also checks the hardware as specified in the customer order against the hardware present in the computer system as built. Lastly, software is provided for implementing a process for resealing the OS such that the first customer boot is a greatly abbreviated OS setup process.

Fully Integrated System Test (FIST) is an enhancement to a software download/install process in the build-to-order factory. In particular, FIST allows the customer's software and hardware to be tested in an automated manner in the factory burn-rack. At the end of the software download/install phase, the computer system is rebooted, wherein the computer system enters an OS setup. The computer system runs completely through the OS setup automatically and then reboots to the OS' desktop. Upon reaching the desktop, the OS runs a prescribed software program, referred to herein as HardTack, that checks the computer system for any errors found during the OS setup. These can be error codes in a device tree of the system registry for W95 and W98 or services tree in the system registry of NT4. If the prescribed HardTack program finds an error during this process, it can report the error to prescribed error logs.

Upon successful completion of FIST testing in the burn rack, suitable manufacturing process code then causes the OS to remove the FIST files and reseal the custom configured computer system, in preparation for shipment of the custom configured computer system to the customer. At the customer site, the computer system boots to the standard OS setup screens. Since the machine has already gone through OS setup in the burn rack at the factory, the customer setup time is reduced from thirty (30) to forty-five (45) minutes to about two to five minutes, yielding an improvement in the customer setup experience. Without FIST, there are a few times during an OS setup when the computer system appears to be hung with little or no activity, i.e., during hardware detect and software setup. Since hardware detection and software setup are run in the burn rack using FIST, the customer's setup time is thereby greatly reduced and the tendency to think or believe that the computer system has problems during an initial boot at the customer site is alleviated.

The FIST process thus provides a number of benefits. FIST checks the customer's computer system to verify that the combination of hardware and software originally ordered by the customer is recognized and properly set up by the OS. During the testing phase of FIST, any drivers that are not properly installed, any extra hardware, and/or most hardware failures are readily uncovered or found.

To implement FIST in the build-to-order manufacturing process, prescribed system requirements are necessary as discussed in the following. FIST requires information about a specific product family (i.e., a particular product line of desktop or notebook computer system) that FIST is being implemented with in order to run properly. This information is in the form of an information or INI file (e.g., TACKxxxx.INI). Any given INI file is written to include information about error codes that are permitted to be present on a given build-to-order computer system. An example of this might include a second IDE controller for portable or notebook computers. Portables don't use the second IDE controller and so the OS such as W98 would generate an error code during an OS setup. The TACKxxxx.INI file includes information for use in controlling the OS setup to bypass this error code on the particular portable computer systems thus affected. TACKxxxx.INI files are generated as needed for each new family of computer systems being manufactured by the build-to-order manufacturer.

In addition, a primary requirement for FIST is performing an unattended OS setup in the factory burn-rack. To enable this, the manufacturing process code or drivers to support the build-to-order manufacture of new computer systems must operate without user input during an OS setup. That is, new drivers requiring installation must install without user input during OS setup. FIST requires unattended setup in the burn-rack, since any required user input would make the setup process hang.

With the present embodiments, a system test, both hardware and software, is thus achieved for a fully integrated custom-built computer system. In contrast, with the spray and pray model, a fully integrated system did not occur until after first customer boot at the customer site. Furthermore, with the present embodiments, confirmation is obtained at the manufacturer's site that the custom-built computer system is correctly built and the hardware and software are fully integrated.

At a very high level, FIST moves that portion of the first customer boot in which the OS installs, and completes driver and application installation, into the burn rack at the factory. The occurrence of the fully integrated custom configured computer system is thus moved from the customer site and into the factory.

FIST thus does two things. First, FIST moves that portion of the computer manufacturing process where the computer system is actually integrated, by setting up all the hardware and software together, into the burn rack portion of the manufacturing process. FIST also adds a piece of code to the manufacturing process which progressively marches down the registry (an internal database to the OS) looks at every device in the registry, and inquires whether or not each hardware component or device has a problem, until all hardware components or devices in the registry have been checked. The code checks that 1) the OS believes that the desired hardware is present and that 2) the hardware is integrated properly and is functional. As a result, every hardware component is checked from the OS perspective to ensure that there are no problems, and that the OS believes that the hardware is functional. Note that there may exist some configuration and functionality problems that a given OS may not detect.

The present embodiments facilitate the testing of the various components and the interoperability of those components in a custom configured computer system from the point of view of the OS installed on the custom configured computer system. In the OS environment, as individual components are brought online, the OS has a way of indicating as to whether a device will or will not work in the target environment. The present embodiments do not miss any component so long as the OS believes or thinks that the component works.

In operation, the OS installer installs a driver, the driver attaches to a given plug-in card, the installer configures the card, qualifies that the card is ready to work as per the OS, and tells the OS that the driver and associated card are working correctly. Any problems encountered during the install are reported back to the OS in accordance with the particular OS being installed, furthermore being used by the present embodiments.

Use of the OS installer however does not guarantee full functionality. For example, a video card may look to the OS to be fine. There may be a bad (defective) RAM DAC on the video card such that there is no video output signal from the card. The OS has no way of telling if the RAM DAC is operating properly. In a general case, nearly all of the configuration issues previously encountered will be caught by the present embodiments. A more likely case may include two cards, X and Y. Card X is a functional card. Card Y is a functional card. Each card tests fine using the DOS based diagnostics, however, each card requires use of interrupt request IRQ5. Unfortunately, when card X and Y are placed into the same target system, there exists only one IRQ5. As a result, one of either card X or card Y will end up being non-functional. As the respective drivers for the cards are configured by the OS, one of the drivers will report back that it has no IRQ (i.e., I got no IRQ and I really need one). At that point, FIST will be alerted that a problem has been uncovered and an appropriate corrective action will be taken. In the illustration given above, interoperability between two components resulted in the occurrence of a system integration problem.

In another scenario, hardware may be placed into a target system without corresponding software. This may be the result of extra cards in the target system. In such an instance, software drivers for the erroneous card are not downloaded onto the target system hard drive, since the erroneous card is not intended to be on the target system.

With the present embodiments, FIST will detect the presence of an erroneous component in the target system. That is, during the OS install portion of the improved manufacturing process, the OS will report the presence of a card and the absence of a corresponding driver, thus signaling an integration problem. This test indicates the integration problem and that a failure, has occurred, thus failing the target system during the manufacturing of the same. Specific hardware that fails can be identified, for example, using the plug-n-play identification (ID) of the respective hardware.

FIST includes suitable program code which runs on the target system during a system integration testing portion of the manufacturing process for performing the functions as discussed herein. Errors will be logged if there are errors to report. The environment in which FIST is working under includes the OS installer portion of the manufacturing process. FIST is started by the fact that FIST is a step in the hardware testing and software download process. In the past, upon completion of hardware testing and software download in the burn rack process, the custom configured computer system would be packaged and shipped to the customer without a fully integrated system test. With the present embodiment, subsequent to hardware testing and software download, but prior to package and shipment to the customer, a custom configured computer system undergoes a fully integrated system test. The computer system includes the FIST program test code resident upon the system's hard drive. The target system is caused to undergo a reboot, for example by powering the system OFF and then ON or by other suitable manufacturing process code action. The reboot causes an equivalent of a first customer boot of the system, wherein the OS installer of the target system executes the OS installation.

According to the present embodiments, FIST process code is resident upon the target system. The FIST process code includes HardTack. Once the OS is set up, the OS is programmed via suitable manufacturing process code to the launch HardTack. HardTack is resident in the target system that is fully configured and set-up. HardTack interrogates the OS registry, progressing down a list of hardware devices (e.g., cards), checking each one to make sure that the respective hardware device has been installed correctly and that no errors have occurred with a respective hardware device.

In addition to looking for errors recognized by the OS, FIST can detect that other types of errors may have occurred. There may be instances where a particular card (e.g., a video card requiring a special driver) has been inserted into the target system without a corresponding special driver, but instead a default driver has been loaded onto the target system. HardTack will check for such an occurrence. For example, a customer may have ordered video card A which requires a special driver A. During the manufacturing assembly process, driver A got loaded onto the target system, however video card B was inadvertently inserted. During the OS install process, the OS installer will recognize that a video card is present, but not be able to distinguish what video card it is. As a result, the OS installer installs a generic driver. HardTack includes suitable program instructions to detect such an occurrence and thus identify such a problem. Such a problem can occur with respect to video cards, network interface cards, network controllers, etc.

The present embodiments further identify whether or not the custom computer system contains the correct hardware and the appropriate software to go along with the hardware. An output tree of the hardware components found in the system and a status of each component is provided in an output report used by the manufacturing process. If any hardware status is unacceptable, then that occurrence is marked as an error. Upon an error, the custom configured computer system is failed.

During hardware testing and software download, the custom configured computer systems are in the burn rack and are connected to a network server. After the fully integrated system test has been performed, the custom configured computer system is rebooted and can communicate with the network again. At that point, any errors detected during FIST will be transferred to and/or acknowledged by the network. In addition, some form of visual/audible indication may be used on the burn rack to indicate to an observer that a particular custom configured computer system has failed the fully integrated system test. The custom configured computer system which has failed the fully integrated system test is appropriately tagged as a standard factory failure. Those computer systems which are tagged as a standard factory failure are then processed in accordance with a prescribed standard factory failure mode process for appropriate remedy of the uncovered error(s) or fault(s).

With FIST, one or more logs of every device found in the custom configured computer system is generated. If any of those devices fail, the device logs, including their respective failures, are then copied into the standard factory failure logging mechanism. Technicians who subsequently service the failed computer systems will thus receive a listing of failed devices. A failure listing may state or indicate, for example, that a bad driver description was found for a standard VGA video card; an Error 28 has occurred on device PCI steering; or other error message. PCI steering is a description of the device and the Error 28 is a pre-defined error code or number. The error listing format may include:<Error code>, <message (e.g., no drivers for this device)>, <name of device>.

As discussed herein, various error codes are detected in FIST. The error codes depend upon the particular OS being setup. FIST is designed for use in an OS setup of a prescribed OS, which may include W95, W98, NT4, NT5, or other OS.

In addition to finding and reporting OS detected errors, FIST includes the following error messages for HardTack in accordance with the embodiments of the present disclosure. The error messages include i) encountered bad driver description, ii) device class is unknown, iii) required class is missing, and iv) required hardware ID missing.

Encountered_Bad_Driver_Desc—The Encountered_Bad_Driver_Desc error message indicates that a driver description was encountered in the registry that should not have been there. This usually means that a generic driver was installed for a device, because no specific driver was available.

Device_Class_Is_Unknown—The Device_Class_Is_Unknown error message indicates that a device does not have a valid class. The OS will set the device class to UNKNOWN in this case. This usually indicates that the drivers for a device were not installed correctly or not at all. It could also mean that the incorrect drivers were installed for a device.

Required_Class_Is_Missing—There are several device classes that will always be present after the OS has completed SETUP. These include keyboard, system, display, etc. A list of required classes is contained in HARDTACK.INI. The Required_Class_Is_Missing error indicates that one of the required classes was not found in the registry. This could mean that the software download doesn't match the system or the OS is not installed correctly.

Required_Hardware_ID Missing—This is similar to the above Required_Class_Is Missing error message, except that the Required_Hardware_ID_Missing applies to Hardware ID's in the registry. Similar causes apply.

Still other error messages may include a Status Flag and a Mask error. The Mask error message indicates a device failure, the Mask error including, for example, a device status bit and debug data. The device status bit is a bit that indicates the failure. When the Mask error is encountered, a message can also be displayed to indicate what the bit means. The rest of the data is debug data. The Mask error usually indicates that a device driver has been installed that was unable to start, possibly indicating a mismatch between the hardware and driver or a driver for which there is no hardware.

After repairing detected fault(s), a technician returns the computer system to the burn rack or other suitable point in the manufacturing process.

Figure 6:
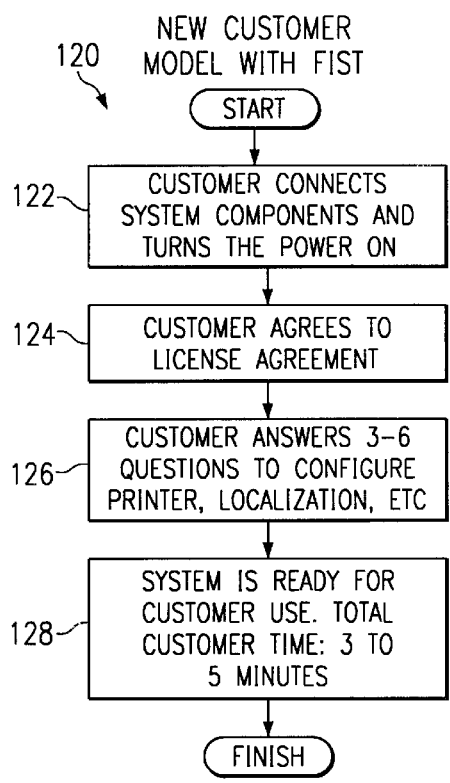
FIG. 6 is a flow diagram view of a customer model in connection with a first customer boot of a custom configured computer system according to the fully integrated system test embodiments of the present disclosure.

Turning briefly to FIG. 6, customer model 120 resulting from the BTO manufacturing model of FIGS. 3 and 4 is presented. The customer model 120 begins with a customer connecting system components together (Step 122) such as the keyboard, monitor, pointing device, etc. to the base unit of the computer system and powering the computer system ON. In a next step, the customer agrees to a typical software license agreement (Step 124). In step 126, the customer answers several questions (e.g., three to six questions) to configure the printer, localization, time zone, etc.. In Step 128, the computer system is now ready for customer use. The total time elapsed for the customer in setting up the customer's new computer system is thus on the order of approximately two (2) to five (5) minutes, from power ON.

The present embodiments thus eliminate the lengthy OS initial boot installation time previously experienced by the customer, in which a customer was very prone to interrupt the OS initial boot installation process due to the lengthy OS install time required (on the order of 20–45 min). The quality of the custom configured computer systems is improved also. In the past, if the OS initial boot installation was interrupted, the installation could not be readily recovered. With the present embodiments, the first customer boot requires a few minutes, during which time the customer is prompted to answer questions regarding necessary information such as time zone, license acceptance, etc. The customer will no longer have to wait many minutes between being prompted for inputs. Rather, the customer now only has a few seconds between the initial boot question prompts. The duration of the initial customer boot is thus reduced by an order of magnitude.

While some amount of factory throughput is consumed by the FIST embodiments, customer satisfaction and a reduction in failed computer systems returned to the factory from customers are achieved. Quality and customer experience are greatly improved.

The present embodiments facilitate moving the OS installation and OS integration of hardware/software from the customer site and placing the same in the manufacturer site. The custom configured computer system is thus fully integrated as custom ordered when received by the customer. HardTack code is executed during the burn rack portion of the manufacturing process to ensure that all of the intended hardware which was ordered is indeed correctly installed in the computer system.

With FIST, true system integration of software installation occurs. With the present embodiments, software bits are downloaded onto the target computer system (i.e., the spraying of bits on the hard drive), including the download of the FIST code. The next new step is to perform an in-factory first boot, where the OS, the drivers, the applications become set-up and configured. The manufacturing process code contains suitable instructions for execution by the target system to cause the target system to re-boot itself for initiating the in-factory customer first boot of the target computer system. The target computer system will boot up in a manner similar to that previously experienced at the customer site. During the in-factory first boot, the OS does what the OS needs to do to make itself work as designed by the creator of the OS. To the computer system, the system would not know that it was in the factory or at the customer site, other than what it has been programmed to do to make it do what the computer system is doing.

During the OS setup at the factory, the OS completes its own installation. There is an OS setup boot loader that copies prescribed files, expands the files (i.e. decompresses the files), makes the OS executable, and actually installs itself on the hard disk drive. The core OS then searches the computer system to find out what hardware is connected to the computer system. Upon finding the hardware, the OS then installs software drivers corresponding to the hardware. The OS configures all the resources of the computer system.

The OS then loads up any software applications. The OS then does some final adjustments, the adjustments having hooks into the OS at a place where, when the OS is done, the OS will run some other routines, the other routines including the FIST HardTack code. As discussed, the HardTack code operates in conjunction with providing a fully integrated system test.

The OS has the capability of being hooked into at certain points during its boot up to enable other functions, applications, or actions to be carried out, as may be desired during the in-factory first boot-up process. For example, during the in-factory first boot, the OS can be instructed that upon completing the standard OS boot, run the HardTack application. The HardTack application is then run, independent of the OS. An appropriate manufacturing process mechanism is used for automatically running the HardTack code. In one embodiment, the HardTack code could be placed in the target computer system's Start Menu, such that the HardTack code is run automatically upon the OS reaching the desktop.

Testing by the OS and subsequent evaluation of test results by the HardTack application during the in-factory first customer boot-up process provides several advantages. First, the quality of custom configured computer systems being manufactured is greatly increased. Secondarily, the previous long first customer boot at the customer site has been moved back into the factory, rendering a much shorter new first customer boot. As a result, a customer is highly likely to have a positive experience at the new first customer boot of the customer's custom configured computer system.

Upon a custom configured computer system being tested and having passed, the computer system is then marked with a suitable designation as having passed (i.e., the fully integrated system test was successful). The successfully tested computer system is then cleaned up and re-sealed. Clean up and resealing involves removing the HardTack application and resetting the OS for the new first customer boot. The OS is thus now in a condition of being fully integrated, in terms of hardware and software, at the factory as determined by passing the system test. In a preferred embodiment, no remnants for executing the FIST remain in the computer system upon shipment from the factory to the customer. In other words, no FIST test components are left on the computer system once the computer system has been cleaned up and resealed. Upon the occurrence of the new customer first boot at the customer site, the typical licensing acceptance and other typical computer user specific information requests are made.

After HardTack is run, if HardTack indicates that the computer system tested okay (i.e., the computer system is fully integrated and functional), then the next part of the manufacturing process is a FIST clean-up. If HardTack indicates that the computer system did not test okay, then the next part of the manufacturing process is to fail the computer system and take an appropriate remedial action.

The present embodiments are directed to the manufacture of custom configured computer systems. This is in contrast to the manufacture of hundreds of thousands of computer systems having the same identical configuration where testing of a single configuration would be trivial. With the present embodiments, information which is processed by the HardTack code is dependent upon the particular unique configuration of custom configured computer system being manufactured, both hardware and software installed and downloaded into the system. Each custom configured computer system can possibly include a unique configuration, different from any other custom configured computer system being manufactured. The number of possible unique combinations is limited only by the number of configuration options offered by the build-to-order manufacturer. Many different types of custom configured computer systems can thus be manufactured and shipped which are fully integrated systems. Furthermore, the present embodiments are not specific to any one OS. The fully integrated system test process can be implemented for any OS.

Inputs to the FIST HardTack module include target system platform. FIST furthermore makes use of information that describes what gets installed onto a particular computer system so that FIST will adapt itself and execute properly. FIST is thus a data driven testing program adaptable in accordance with the custom configured computer system being manufactured. FIST is responsive to configuration data obtained from a customer order, or system descriptor record, for adapting to the computer system under test.

Figure 7:
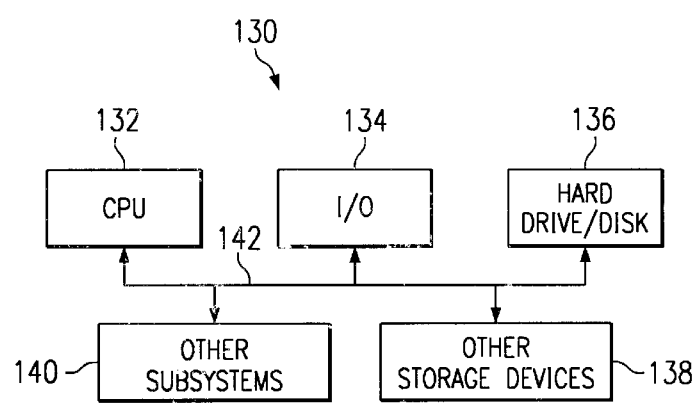
FIG. 7 is a block diagram of an exemplary personal computer system.

Referring briefly to FIG. 7, a system block diagram of a computer system 130 is shown having features thereof configured in accordance a customer configured computer system order as discussed herein. The computer system 130 includes a central processing unit (CPU) 132, input/output (I/O) devices, such as a display, a keyboard, a mouse, and associated controllers, collectively designated by a reference numeral 134, a hard disk drive 136, and other storage devices, such as a may include a floppy disk drive, CD-ROM drive, and the like, collectively designated by a reference numeral 138, and various other subsystems, such as a network interface card (or NIC), collectively designated by a reference numeral 140, all interconnected via one or more buses, shown collectively in FIG. 7 as a bus 142.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A build-to-order manufacturing method for producing a custom configured computer system comprising:

assembling hardware in accordance with a customer order;

testing the assembled hardware;

downloading software to the assembled hardware in accordance with the customer order, the software including an operating system; and performing a fully integrated system test, the fully integrated system test including a) executing an operating system setup configured to fully integrate and test the hardware and software of the custom configured computer system from a perspective of the operating system prior to shipment to a customer and b) automatically executing, subsequent to the operating system setup, a software-based test module configured in accordance with the custom configured computer system being manufactured, being data driven, and having an input and an output, wherein the software-based test module input includes a system ID, a system configuration, a line of business, hardware components, software components, and expected deviations, the software-based test module responsive to data at its input for performing a testing of the integration of hardware and software of the custom configured computer system and further being adapted to uncover a configuration or functionality issue unable to be detected by the operating system and which results in the occurrence of a system integration problem, the configuration or functionality issue including a presence of at least one of an erroneous hardware component, an erroneous software component, and an interoperability between two components, the software-based test module further providing a corresponding test results data at its output.

2. The method of claim 1, wherein the software-based test module includes a query of whether or not the operating system has detected any errors during execution of the operating system setup.

3. The method of claim 1, wherein the system ID includes a serial number for identifying the particular computer system being manufactured, the system configuration includes a listing of the hardware and software components of a customer order, the line of business includes the particular base unit identification of a given line of business for a particular desktop or notebook model, hardware components include those as ordered per the customer order, software components include those as ordered per the customer order, and expected deviations include prescribed deviations which can be expected for a particular type of computer system being manufactured.

4. The method of claim 1, wherein the software-based test module output includes confirmation of proper component operation, logging of a device tree for the custom configured computer system, and confirmation of proper drivers being installed in the custom configured computer system.

5. The method of claim 4, further including querying the software-based test module output to determine whether or not any errors were detected, and if errors, then performing a suitable error logging and signaling a hard fail, otherwise if no errors, then cleaning up the fully integrated system test software-based test module from the custom configured computer system and sealing the custom configured computer system.

6. The method of claim 1, wherein the software-based test module launches in response to the operating system reaching a operating system desktop condition.

7. The method of claim 1, wherein the fully integrated system test includes a query as to whether or not the computer system and all components tested okay, and if the computer system and all components tested okay, then removing the fully integrated system test from the custom configured computer system, sealing the custom configured computer system and preparing the custom configured computer system for a subsequent customer first boot, and if the computer system and all components did not test okay, then analyzing the custom configured computer system in accordance with errors uncovered by the fully integrated system test, and executing an appropriate corrective action.

8. A build-to-order manufacturing method for producing a custom configured computer system comprising:

assembling hardware in accordance with a customer order;

testing the assembled hardware;

downloading software to the assembled hardware in accordance with the customer order, the software including an operating system; and performing a fully integrated system test, the fully integrated system test including the execution of an operating system setup for fully integrating and testing the hardware and software of the custom configured computer system from a perspective of the operating system prior to shipment to a customer and automatically executing subsequent to the operating system setup, a software-based test module in accordance with the custom configured computer system being manufactured, being data driven, and having an input and an output, wherein the software-based test module input includes a system ID, a system configuration, a line of business, hardware components, software components, and expected deviations, the software-based test module further for testing the integration of hardware and software of the custom configured computer system and being adapted to uncover a configuration or functionality issue unable to be detected by the operating system and which results in the occurrence of a system integration problem, the configuration or functionality issue including a presence of at least one of an erroneous hardware component, an erroneous software component, and an interoperability between two components, and the software-based test module output including confirmation of proper component operation, logging of a device tree for the custom configured computer system, and confirmation of proper drivers being installed in the custom configured computer system.

9. The method of claim 8, wherein
the system ID includes a serial number for identifying the particular computer system being manufactured, the system configuration includes a listing of the hardware and software components of a customer order, the line of business includes the particular base unit identification of a given line of business for a particular desktop or notebook model, hardware components include those as ordered per the customer order, software components include those as ordered per the customer order, and expected deviations include prescribed deviations which can be expected for a particular type of computer system being manufactured.

10. The method of claim 8, further including querying the software-based test module output to determine whether or not any errors were detected, and if errors, then performing a suitable error logging and signaling a hard fail, otherwise if no errors, then cleaning up of the fully integrated system test software-based test module from the custom configured computer system and sealing the custom configured computer system.

11. A computer system comprising:
a processor;
a memory; and
a storage device, the computer system having been manufactured in accordance with a build-to-order manufacturing method including assembling hardware in accordance with a customer order, testing the assembled hardware, downloading software to the assembled hardware in accordance with the customer order, the software including an operating system, and performing a fully integrated system test, the fully integrated system test including a) the execution of an operating system setup configured to fully integrate and test the hardware and software of the custom configured computer system from a perspective of the operating system prior to shipment to a customer and b) the automatic execution, subsequent to the operating system setup, a software-based test module configured in accordance with the custom configured computer system, being data driven, and having an input and an output, wherein the software-based test module input includes a system ID, a system configuration, a line of business, hardware components, software components, and expected deviations, the software-based test module further being responsive to data at its input for performing testing of the integration of hardware and software of the custom configured computer system and further being adapted to uncover a configuration or functionality issue unable to be detected by the operating system and which results in the occurrence of a system integration problem, the configuration or functionality issue including a presence of at least one of an erroneous hardware component, an erroneous software component, and an interoperability between two components, the software-based test module further providing a corresponding test results data at its output, wherein the system ID includes a serial number for identifying the particular computer system being manufactured, the system configuration includes a listing of the hardware and software components of a customer order, the line of business includes the particular base unit identification of a given line of business for a particular desktop or notebook model, hardware components include those as ordered per the customer order, software components include those as ordered per the customer order, and expected deviations include prescribed deviations which can be expected for a particular type of computer system being manufactured.

12. The computer system of claim 11, wherein the software-based test module includes a query of whether or not the operating system has detected any of errors during execution of the operating system setup.

13. The computer system of claim 11, wherein the software-based test module output includes confirmation of proper component operation, logging of a device tree for the custom configured computer system, and confirmation of proper drivers being installed in the custom configured computer system.

14. The computer system of claim 11, wherein the software-based test module launches upon the operating system reaching a operating system desktop condition.

15. A manufacturing method for producing a computer system comprising:
assembling hardware in accordance with an order;
testing the hardware;
downloading software to the assembled hardware in accordance with the order, the downloaded software including at least an operating system; and
executing a) an operating system setup for substantially integrating and testing the hardware and downloaded software from a perspective of the operating system prior to shipment to a customer and b) automatically executing, subsequent to the operating system setup, a software-based test module configured in accordance with the computer system being manufactured, being data driven, and having an input and an output, wherein the software-based test module input includes a system ID, a system configuration, a line of business, hardware components, software components, and expected deviations, the software-based test module being responsive to data at its input for performing a testing of the integration of hardware and downloaded software of the computer system and further being adapted to uncover a configuration or functionality issue unable to be detected by the operating system and which results in the occurrence of a system integration problem, the configuration or functionality issue including a presence of at least one of an erroneous hardware component, an erroneous software component, and an interoperability between two components, the software-based test module further providing corresponding test results data at its output.

16. The method of claim 15, wherein the software-based test module includes a query of whether or not the operating system has detected any errors during execution of the operating system setup.

17. The method of claim 15, wherein
the software-based test module input includes a system ID, a system configuration, a line of business, hardware components, software components, and expected deviations, wherein
the system ID includes a serial number for identifying the particular computer system being manufactured,
the system configuration includes a listing of the hardware and software components of a customer order,
the line of business includes the particular base unit identification of a given line of business for a particular desktop or notebook model,
hardware components include those as ordered per the customer order,
software components include those as ordered per the customer order, and
expected deviations include prescribed deviations which can be expected for a particular type of computer system being manufactured.

18. The method of claim 15, wherein the software-based test module output includes confirmation of proper component operation, logging of a device tree for the computer system, and confirmation of proper drivers being installed in the computer system.

19. The method of claim 18, further including querying the software-based test module output to determine whether or not any errors were detected, and responsive to a detection of errors, performing an error logging and signaling a hard fail, and responsive to a detection of no errors, clearing the integrated system test software-based test module from the computer system and sealing the computer system.

20. The method of claim 15, wherein the software-based test module launches in response to the operating system reaching an operating system desktop condition.

21. The method of claim 15, wherein the integrated system test includes a query as to whether or not the computer system and all components tested okay, and
in response to the computer system and all components testing okay, removing the integrated system test components from the computer system, sealing and preparing the computer system for a subsequent customer first boot, and
in response to the computer system and all components not testing okay, analyzing the computer system by a service technician in accordance with errors uncovered by the integrated system test, further for executing an appropriate corrective action.

22. A computer system comprising:
a processor;
a memory; and
a storage device, the computer system having been manufactured in accordance with a manufacturing method including assembling hardware in accordance with an order, testing the assembled hardware, downloading software to the assembled hardware in accordance with the order, the downloaded software including an operating system, and performing a substantially integrated system test, the integrated system test including a) executing an operating system setup for integrating and testing the hardware and downloaded software of the computer system from a perspective of the operating system prior to shipment to a customer and b) automatically executing, subsequent to the operating system setup, a software-based test module configured in accordance with the custom configured computer system, being data driven, and having an input and an output, wherein the software-based test module input includes a system ID, a system configuration, a line of business, hardware components, software components, and expected deviations, the software-based test module responsive to data at its input for performing the testing of the integration of hardware and downloaded software of the computer system and further being adapted to uncover a configuration or functionality issue unable to be detected by the operating system and which results in the occurrence of a system integration problem, the configuration or functionality issue including a presence of at least one of an erroneous hardware component, an erroneous software component, and an interoperability between two components, the software-based test module further providing a corresponding test results data on its output, wherein the system ID includes a serial number for identifying the particular computer system being manufactured, the system configuration includes a listing of the hardware and software components of a customer order, the line of business includes the particular base unit identification of a given line of business for a particular computer model, hardware components include those as ordered per the customer order, software components include those as ordered per the customer order, and expected deviations include deviations that can be expected for a particular type of computer system being manufactured.

23. The computer system of claim 22, wherein the software-based test module includes a query of whether or not the operating system has detected any errors during execution of the operating system setup.

24. The computer system of claim 22, wherein the software-based test module output includes confirmation of proper component operation, logging of a device tree for the computer system, and confirmation of proper drivers being installed in the computer system.

25. The computer system of claim 22, wherein the software-based test module launches in response to the operating system reaching a operating system desktop condition.

* * * * *